United States Patent
Veis et al.

(10) Patent No.: US 12,202,195 B2
(45) Date of Patent: Jan. 21, 2025

(54) THREE-DIMENSIONAL OBJECT PRODUCTION

(71) Applicant: Hewlett-Packard Development Company, L.P., Spring, TX (US)

(72) Inventors: Alex Veis, Netanya (IL); Esteve Comas Cespedes, Sant Cugat del Valles (ES); Joaquim Brugue Garvi, Sant Cugat del Valles (ES); Raimon Castells De Monet, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 117 days.

(21) Appl. No.: 18/108,130

(22) Filed: Feb. 10, 2023

(65) Prior Publication Data
US 2023/0191695 A1    Jun. 22, 2023

Related U.S. Application Data (63) Continuation of application No. 16/608,234, filed as application No. PCT/US2018/015010 on Jan. 24, 2018, now Pat. No. 11,607,843.

(51) Int. Cl.
*B29C 64/165*    (2017.01)
*B29C 64/209*    (2017.01)
(Continued)

(52) U.S. Cl.
CPC .......... *B29C 64/165* (2017.08); *B29C 64/209* (2017.08); *B29C 64/282* (2017.08);
(Continued)

(58) Field of Classification Search
CPC ... B29C 64/165; B29C 64/171; B29C 64/282; B29C 64/209; B29C 64/393; B29C 64/291; B33Y 10/00; B33Y 30/00; B33Y 50/02
See application file for complete search history.

(56) References Cited

U.S. PATENT DOCUMENTS 7,988,259 B2    8/2011    Hishida et al.
8,287,112 B2    10/2012   Van Thillo et al.
(Continued)

FOREIGN PATENT DOCUMENTS

CN    106394003 A    2/2017
CN    106794623 A    5/2017
(Continued)

OTHER PUBLICATIONS

SpecBright UV LED Arealights, "High-Intensity UV LED illumination designed with vision in mind", Oct. 17, 2006, Retrieved from <URL:https://web.archive.org/web/20061109154429/http://www.stockeryale.com/i/leds/products/uv_arealights.pdf>, p. 4.
(Continued)

*Primary Examiner* — Stella K Yi
(74) *Attorney, Agent, or Firm* — Shook, Hardy & Bacon L.L.P.

(57) ABSTRACT

An example apparatus to produce a three-dimensional object comprises a controller, a build area configured to receive a layer of particulate material, a printhead, and an ultraviolet light emitting diode energy source. The controller is to cause the printhead to deposit a liquid which absorbs ultraviolet radiation onto the layer of particulate material. The controller is further to cause the ultraviolet light emitting diode energy source to irradiate the liquid, after the liquid has been
(Continued)

deposited onto the layer of particulate material, thereby to heat the liquid and cause a portion of the particulate material to solidify.

20 Claims, 7 Drawing Sheets

(51) Int. Cl.
    *B29C 64/282*     (2017.01)
    *B29C 64/291*     (2017.01)
    *B29C 64/393*     (2017.01)
    *B33Y 10/00*     (2015.01)
    *B33Y 30/00*     (2015.01)
    *B33Y 50/02*     (2015.01)

(52) U.S. Cl.
    CPC .......... *B29C 64/291* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 8,876,513 B2 | 11/2014 | Lim et al. | |
| 11,104,065 B2 | 8/2021 | Prasad et al. | |
| 2002/0105114 A1 | 8/2002 | Kubo et al. | |
| 2015/0165680 A1 | 6/2015 | Goto | |
| 2017/0136693 A1 | 5/2017 | Okamoto et al. | |
| 2017/0259559 A1 | 9/2017 | Valade et al. | |
| 2017/0341293 A1 | 11/2017 | Hara | |
| 2017/0360156 A1 | 12/2017 | Lussier | |
| 2017/0361534 A1 | 12/2017 | Fernandez-Nieves et al. | |
| 2018/0015663 A1 | 1/2018 | Zhao et al. | |
| 2018/0015664 A1 | 1/2018 | Kabalnov et al. | |
| 2019/0084230 A1 | 3/2019 | Stadlmann | |

FOREIGN PATENT DOCUMENTS

| | | |
|---|---|---|
| EP | 1661690 A1 | 5/2006 |
| WO | 2016/108519 A1 | 7/2016 |
| WO | 2017/200534 A1 | 11/2017 |

OTHER PUBLICATIONS

Tsao, M-J. et al., "Development of a Color Photo-curable 3d Printing Mechatronics System by Using Multiple Piezoelectric Heads", IEEE, Jul. 10, 2016, pp. 709-714.

THREE-DIMENSIONAL OBJECT PRODUCTION

CROSS REFERENCE TO RELATED APPLICATION

This application is a continuation of nonprovisional U.S. application Ser. No. 16/608,234, filed on 25 Oct. 2019 and entitled "Three-Dimensional Object Production," which is a 35 U.S.C. § 371 national stage application that claims the benefit of and priority to international PCT Application No. PCT/US2018/015010, filed on 24 Jan. 2018 and entitled "Three-Dimensional Object Production," the entireties of which are incorporated by reference herein.

SUMMARY

Apparatus that generate three-dimensional objects, including those commonly referred to as "3D printers", provide a convenient way to produce three-dimensional objects. These apparatus typically receive a definition of the three-dimensional object in the form of an object model. This object model is processed to instruct the apparatus to produce the object using a particulate material or plural particulate materials. This may be performed on a layer-by-layer basis. Generating objects in three-dimensions presents many challenges that are not present with two-dimensional print apparatus.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

As described herein, an example apparatus to produce a three-dimensional (3D) object comprises a printhead configured to deposit a liquid which absorbs ultraviolet radiation onto a layer of particulate material, and an ultraviolet light emitting diode energy source (UV-LED) to emit electromagnetic energy having a maximum intensity at a wavelength between about 200 nm to about 405 nm. In some examples the apparatus further comprises a controller to cause the printhead and UV-LED energy source to perform their functions. The UV-LED energy source is to irradiate the layer of particulate matter with a substantially uniform intensity across the layer, after the liquid has been deposited onto the layer of particulate material, thereby to heat the liquid and cause a portion of the particulate material to solidify. Irradiating the layer means that the liquid is also irradiated. As the liquid, or one or more components of the liquid, absorb the ultraviolet (UV) electromagnetic energy/radiation emitted by the UV-LED energy source, the temperature of the liquid increases. Heat from the liquid is transmitted, for example by conduction, to particulate material in the vicinity of the liquid. The temperature of the particulate material in the vicinity of the liquid therefore also increases. If the temperature of the particulate material in the vicinity of the liquid reaches a threshold temperature, such as a temperature sufficient for the particulate material to melt or sinter, the particulate material will fuse and solidify as it cools. Accordingly, the three-dimensional object can be built on a layer-by-layer basis. In some examples, the UV-LED energy source is a UV-LED energy source comprising one or more UV-LEDs, for example an array of UV-LEDs.

UV-LEDs may emit ultraviolet electromagnetic energy having a narrow spectral width. The spectral width is defined as the range of wavelengths surrounding a peak wavelength, at a power level greater than or equal to half the maximum power level. Thus, the majority of the power emitted by energy source will be within the range of the spectral width. In some examples more than 50%, 60%, 70%, 80% or 90% of the power may be emitted within this range. The peak wavelength has the maximum intensity and may, for example have a wavelength at the center of the spectral width. Thus, an emitter with a narrow spectral width may emit electromagnetic radiation that is within a narrow range of a central peak wavelength. Such an emitter may be known as a narrowband emitter, and may have a spectral width of about 5 nm to about 50 nm. In contrast, a lamp energy source, such as a halogen or incandescent type lamp, generally emits electromagnetic radiation having a large spectral width, and may have a spectral width of greater than about 100 nm. In some examples lamp energy sources have spectral widths of about 1000 nm, and may have many peaks within the emission spectra. Hence, emissions having a large spectral width comprise electromagnetic energy spread over a wide wavelength range. A lamp may therefore be known as a wideband emitter. A laser, for example, comprises an extremely narrow spectral width, and may have a spectral width of less than about 5 nm.

The use of UV-LEDs during three-dimensional object fabrication may provide benefits over the use of wideband energy sources currently used in 3D printing. For example, certain components, such as liquids used in 3D printing, may be chosen or designed to absorb electromagnetic energy having a particular UV wavelength more effectively than other electromagnetic energy having another wavelength, such as Infra-Red (IR). Thus, by using UV-LEDs having a maximum intensity at a wavelength between about 200 nm to about 405 nm, in combination with a liquid which absorbs this UV radiation, the energy efficiency of the heating process can be improved because the wavelength and/or spectral width of the LEDs can be selected to match the absorption characteristics of the liquids. This maximizes the amount of energy that is absorbed by the liquid. This is in contrast to conventional systems where wideband energy sources are used. The use of wideband emitting energy sources may be energy-inefficient because certain wavelengths within the wideband energy are poorly absorbed.

In some examples the UV-LED energy source emits electromagnetic energy having a maximum intensity at a wavelength between about 285 nm to about 405 nm. A UV-LED energy source that emits energy within this range are relatively inexpensive compared to other wavelength LEDs. Such a UV-LED energy source also has no UVC regulation issues because they do not emit energy within the UVC wavelength range of 100-280 nm.

A UV-LED energy source may also have a long lifetime compared to more conventional energy sources, such as lamps. Furthermore, a UV-LED energy source may allow simple DC operation, simple driving control, and/or low voltage operation, and have no regulation issues with electromagnetic compatibility (EMC), radio-frequency interference (RFI), and/or high voltage operation.

A UV-LED energy source may also provide benefits in color 3D printing systems. For example, IR tends to be poorly absorbed by white and yellow colored printing agent liquids, such as ink, used in a color 3D printing process. It has been found that the use of a UV-LED energy source may cause the printing agent temperature to rise faster than occurs when using wideband IR energy sources. If the printing agent is heated at a faster rate, the fusion temperature can be achieved in a shorter time, which reduces the overall time needed to fabricate a 3D object.

It has been found that colored printing agent liquids, such as inks, currently used in color 3D printing have absorption bands within the UV spectrum. Thus, inks already have the ability to absorb energy emitted by the UV-LED energy source and with high efficiency. This can mean that when colored liquids are applied, the particulate material can be fused without the addition of further absorbing liquids, such as dedicated 'fusing' agents. This effect can be achieved using a UV-LED energy source that emits electromagnetic energy having a maximum intensity at a wavelength between about 200 nm to about 405 nm. Specific wavelengths of the UV-LED energy source within this range can be selected to ensure that the energy is absorbed more effectively by the various liquids used in the printing process. For example, the individual color liquids in the CMYK inks may each have a different absorption spectrum for UV energy, so a wavelength may be selected which is absorbed effectively across all the liquids.

Particulate materials used in 3D printing may absorb some UV wavelengths poorly. For example, build material Polyamide 12 (PA-12) absorbs short wavelength UV radiation, but poorly absorbs longer wavelength UV radiation. Poor absorbance may be defined as absorbing less than about 20% or less than about 10% of incident radiation at the wavelength in question. By depositing a liquid which absorbs longer wavelength UV radiation onto the particulate material, and irradiating the layer of particulate material with longer wavelength UV radiation, the liquid absorbs a higher proportion of the UV radiation than the particulate material. Thus, LEDs can be selected that have UV emission wavelengths which are absorbed less efficiently by the particulate material than the liquid. Thus, any particulate material which has had liquid applied is heated more than particulate material to which no liquid is been applied. This can reduce the possibility of the particulate material solidifying in places where liquid has not been applied, when exposed to UV radiation.

Accordingly, in some examples the UV-LED energy source emits electromagnetic energy having a maximum intensity at a wavelength between about 385 nm to about 405 nm. Such wavelengths may be poorly absorbed by certain particulate materials, such as PA-12, and may be absorbed by certain liquids used in 3D printing. Hence, wavelengths may be selected depending upon the type, or types, of materials and liquids used in 3D printing. For example, in some examples the liquid may be a dye or an ink, and common dyes and inks may readily absorb such wavelengths. If multiple liquids are being used, a wavelength can be selected which is most effectively absorbed by the liquids.

In one example, the UV-LED energy source wavelength is selected to have a maximum intensity at a wavelength between about 200 nm to about 405 nm, and that is greater than 100 nm from an absorbance peak from the particulate material. In some examples, when the UV-LED energy wavelength is offset from an absorbance peak of the particulate material by at least this amount, the absorbance by the dry particulate material may be reduced to levels that prevent melting of the material.

In some examples the UV-LED energy source emits electromagnetic energy having a maximum intensity between about 385 and about 395 nm, for example at a wavelength of about 390 nm. This wavelength may provide a good balance between cost of the LED, and good absorption by liquids used in printing.

In some examples the UV-LED energy source emits ultraviolet electromagnetic energy having a spectral width of about 5 nm to about 50 nm. Hence the UV-LED energy source has a narrow spectral width suitable for absorption by a number of liquids used in 3D printing systems. A spectral width within this range can improve absorption efficiency, and therefore energy efficiency.

In some examples the printhead is a first printhead, and the liquid is a first liquid, and the apparatus further comprises a second printhead, wherein the controller is to cause the second printhead to deposit a second liquid which absorbs ultraviolet radiation onto the layer of particulate material, after the first printhead deposits the first liquid. In some examples the first liquid is a dye, and the second liquid is a pigment-based ink. A dye may be a dye-based ink, which comprises a colorant dissolved in liquid, and a pigment-based ink may comprise a powder of solid colorant suspended in a liquid carrier. In some examples one or both of the first and second liquids comprise a pigment or colorant which gives the liquids color. The pigments or colorants may be absorbers that cause the liquid to absorb the UV radiation.

In some examples the first liquid deposited by the first printhead is white, however in other examples the first liquid is colorless. A white liquid may be useful when the particulate material is not white, or when the material changes color from white upon solidification. The white liquid may be deposited onto the layer of particulate material to provide a white "base". Colored liquids may be deposited either directly on top of this white base, or on a new layer of particulate material. Hence, the second liquid may be colored differently, and may therefore be deposited liquid to give color to the object. Other colored liquids may also be deposited.

In some examples each liquid has a different absorption spectrum within the UV wavelength range. Thus a UV radiation wavelength can be selected from within the range of 200 nm to 405 nm, to optimize, increase, and/or balance absorption of the UV radiation by plural liquids.

As mentioned, a particulate material is selected that has a low absorbance level of UV radiation. Thus, the material is heated most effectively in regions where a liquid which absorbs UV radiation is deposited. In examples where the second liquid is colored, the application of the first liquid ensures that the particulate material is fused even in regions having a low color density. For example where the application of the second liquid is performed at less than 100% coverage, areas which do not have the second liquid may not be heated sufficiently to melt or fuse and solidify, so the application of the first liquid may assist with heating such areas.

In some examples the controller is to cause the UV-LED energy source to irradiate the layer of particulate material, and therefore the first liquid before the second printhead deposits the second liquid. Thus, the portions of the particulate material comprising the first liquid can be preheated to almost fusing temperature, without solidifying. In other examples, the portions of the particulate comprising the first liquid can be fully solidified or partially solidified. This may occur in addition to, or instead of a procedure whereby energy is applied to the layer of particulate material before any liquids are applied to the layer.

In some examples the apparatus further comprises a third printhead, wherein the controller is to cause the third printhead to deposit a third liquid which absorbs ultraviolet radiation onto the layer of particulate material, after the second printhead deposits the second liquid. For example, the third liquid may be a liquid colored differently to the second liquid. For example the second liquid may have a Cyan color, and the third liquid may have a Magenta color. Further printheads may deposit further colors, such as Yellow and Black, thereby allowing a plurality of colors to be imparted to the object as it is built layer-by-layer. In some examples, the second and third liquids are deposited from different nozzles in the same printhead.

In other examples, however, the third printhead may be similar to the first printhead and the third liquid may be the same as the first liquid. In certain examples the first and third printheads are arranged at opposite ends of a printer carriage. For example, the first and third printheads may be at opposite ends of the carriage with respect to a direction travelled by the printer cartridge during printing. Thus, the first liquid can be deposited by both the first and third printheads allowing the print carriage to be used in two directions. The CMYK printheads or nozzles may be located between the first and third printheads. Thus, in examples where the first liquid and the third liquid are the same, the third printhead may be configured to deposit the third liquid after the UV-LED energy source has caused a portion of the particulate material to fully solidify.

In some examples the UV-LED energy source is a first UV-LED energy source, and the apparatus comprises a second UV-LED energy source, wherein the controller is to cause the second UV-LED energy source to irradiate the layer and therefore the first liquid, before the second printhead deposits the second liquid. Accordingly, a second UV-LED energy source may be used to pre-heat the first liquid rather than a single UV-LED energy source being used for both pre-heating and solidifying the particulate material. The second UV-LED energy source may be located within the apparatus in a position more suited to preheating the liquid after it has been deposited. In some examples, the second UV-LED energy source comprises one or more UV-LEDs, for example an array of UV-LEDs.

In some examples the first UV-LED energy source has a first peak wavelength and the second UV-LED energy source has a second peak wavelength, the first wavelength and the second wavelength being different to each other. This allows different wavelengths to be used depending upon the function. For example, the first wavelength may be more suited for solidifying the particulate material, and the second wavelength more suited for pre-heating.

In one example, the second peak wavelength used for pre-heating is selected based on the first liquid and the first peak wavelength is selected based on the second liquid. In some examples the first peak wavelength is selected based on both the first and second liquids.

Figure 1:
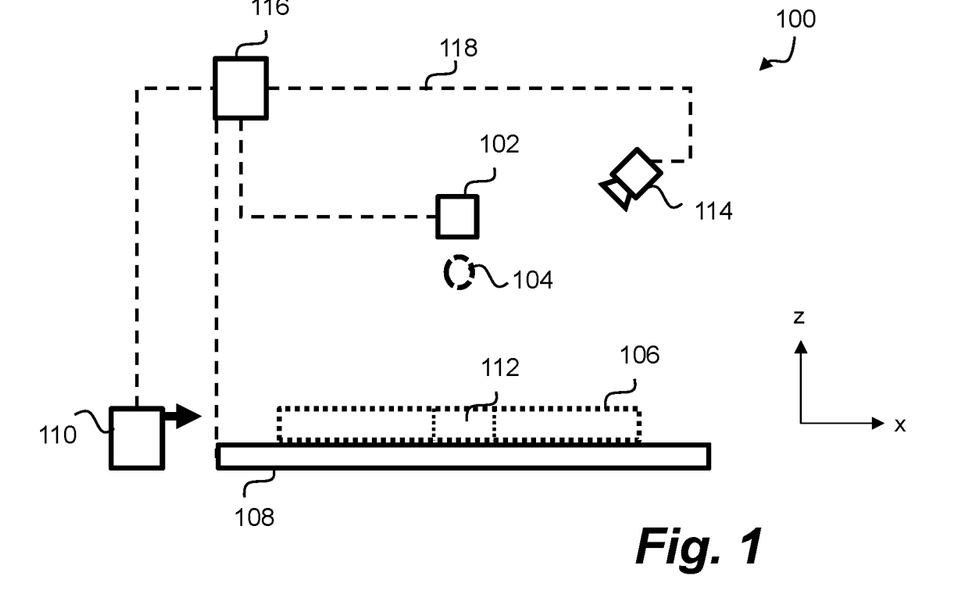
FIG. 1 is a diagram of a three-dimensional printing apparatus according to an example.

FIG. 1 shows an example three-dimensional printing apparatus 100. The three-dimensional printing apparatus 100 comprises a printhead 102. The printhead 102 is arranged to deposit a liquid 104, such as a liquid, upon a layer of particulate build material 106 that is received within a build area, such as on platform 108. In some examples the build area and platform 108 are separate from the printing apparatus 100. In this example, the build area and platform 108 are separate, but are present in use. The particulate material may be, for example, a powdered substrate in the example of FIG. 1. The printhead 102 may be moveable relative to the material 106. In one case, the print head 102 may be located in a moveable carriage located above the material 106. The printhead 102 may move in one, two or three directions over the material 106, for example along the x-axis direction indicated in FIG. 1, along a y-axis, for example into and out of the page of FIG. 1, and in some examples vertically in the z-axis direction. In another case, the platform 108 and material 106 may be moveable underneath a static print head. Various combinations of approaches are possible.

In the example of FIG. 1, the printhead comprises one or more nozzles configured to deposit the liquid onto a portion 112 of the layer of particulate material 106. The ejection mechanism may be based on piezo-electric or thermal elements. The three-dimensional printing apparatus 100 may have a resolution similar to that of a two-dimensional printing apparatus, for example 600 or 1200 dots per inch (DPI).

The particulate material 106 may be deposited within the build area by a substrate supply mechanism 110. The supply mechanism 110 may be configured to supply at least one layer of particulate material 106 onto which the liquid 104 can be deposited. In some examples the supply mechanism 110 is separate and removable from the apparatus 100, and may be present in use.

In the three-dimensional printing apparatus 100 of FIG. 1, an object may be built up layer by layer. Each layer of material 106 may have a thickness in the z-axis. In one case, this thickness may be between 70-120 microns, although in other examples thicker or thinner layers may be formed. The three-dimensional printing apparatus 100 is arranged to solidify portions 112 of the material in each successive layer.

In one example, the liquid can be deposited within an addressable area of a layer of build material. Accordingly, through the deposit of multiple droplets over successive layers, a three-dimensional object can be built.

The apparatus 100 further comprises an UV-LED energy source 114. The UV-LED energy source may comprise one or more UV-LEDS, such as an array of UV-LEDs, for example. Following application of the liquid 104, the UV-LED energy source 114 emits ultraviolet electromagnetic radiation over the layer 106. The liquid is also configured to absorb ultraviolet radiation emitted by the UV-LED energy source 114. This radiation causes the material to melt or sinter, and then fix or solidify upon cooling in the regions where the liquid 104 was deposited. For example, the UV-LED energy source may irradiate the layer of material 106 with electromagnetic radiation within a wavelength range, and because the liquid is an absorber of the specific UV wavelengths emitted by the UV-LED energy source 114, the liquid absorbs at least some of the energy and transfers at least some of the absorbed energy to the material in the vicinity of the liquid. Regions which do not receive the liquid 104 may not heat up sufficiently to melt and subsequently solidify. To reduce the effect of neighbouring material solidifying in other non-object areas, the UV wavelength can be selected so that it is efficiently absorbed by the liquid, but poorly absorbed by the dry material 106. In one example, the peak wavelength has a maximum intensity at a wavelength of between about 385 nm to about 405 nm, however other wavelengths may be suitable depending upon the liquid and particulate material absorbances.

The apparatus may further comprise a controller 116. The controller 116 can control the various components of the apparatus 100. The controller 116 may comprise one or more processors for example. The controller 116 may further comprise memory, to store instructions that when executed, cause the processor(s) to implement one or more methods. For example, the controller may control the printhead 102, the supply mechanism 110, the carriage, the UV-LED energy source 114 and movement of the platform 108. The memory may be a non-transitory computer-readable storage medium in some examples. The controller 116 may be connected directly or indirectly to the various components of the printing system 100 via one or more communication paths 118, shown depicted as dashed lines. In some examples, the various components each have their own controller which may operate independently of each other, or in cooperation.

In one example, the liquid 104 is colored. For example, the liquid may be a colorant, such as a dye or pigment based ink. The liquid may therefore comprise a colorant and/or a pigment. The colorants or pigments may themselves be the elements that enable the liquid to absorb the ultraviolet radiation, however in some examples other properties of the liquid enable the liquid to absorb the radiation.

Figure 2:
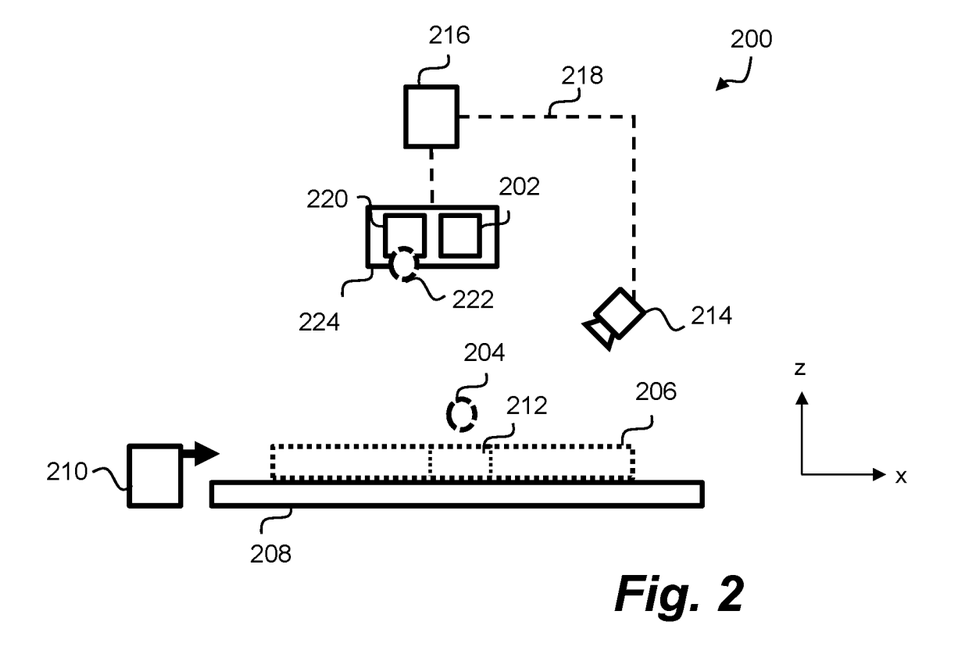
FIG. 2 is a diagram of a three-dimensional printing apparatus according to a second example.

FIG. 2 shows another example three-dimensional printing apparatus 200 that is substantially the same as apparatus 100, but further comprises a second printhead 220 configured to deposit a second liquid 222. The second printhead 220 is arranged adjacent to the first printhead 202 in this example, although other arrangements are possible.

The three-dimensional printing apparatus 200 comprises a first printhead 202. The first printhead 202 is arranged to deposit a first liquid 204 upon a layer of particulate build material 206 that is received within a build area, such as on platform 208. Similarly, the second printhead 220 is arranged to deposit a second liquid 222 upon a layer of material 206. In one case, the first and second printheads 202, 220 are located in a moveable carriage 224 located above the platform 208. The carriage 324 may move in one, two or three directions over the material 206. In another case, the platform 208 and material 206 may be moveable underneath a static carriage 224. In some examples the first and second printheads 202, 220 are not located in a carriage 224. Various combinations of approaches are possible in different examples.

In the example of FIG. 2, the first printhead 202 comprises one or more nozzles configured to deposit the first liquid 204 onto a portion 212 of the layer of particulate material 206. Similarly, the second printhead 220 comprises one or more nozzles configured to deposit the second liquid 222 onto a portion 212 of the layer of particulate material 206. In this example, both liquids are deposited within the same portion 212 and at least partially overlap, however in some examples one of the liquids may be deposited within an area. In one example every portion receives the first liquid, whereas in other examples some portions receive the second liquid.

The apparatus 200 further comprises an UV-LED energy source 214.

In one specific implementation, the apparatus 200 may be used to print a colored three-dimensional object. In order to achieve a good quality print, a white liquid may first be applied to particulate material 206 upon which one or more other colored liquids are applied, such as Cyan, Magenta, Yellow and/or Black (CMYK), or other spot colors. The first liquid may be colorless, however in one example the first liquid is a white colored liquid, such as a dye. Thus, the white colored liquid has no, or a low absorbance of visible light. The second liquid may be a liquid colorant, which is applied after the first liquid has been deposited. In any case, both the first liquid 204 and the second liquid 222 absorb ultraviolet radiation. In one particular example, the first liquid is Contone-O.

In a first example, the first printhead 202 deposits the first liquid 204, followed by the second printhead 220 depositing the second liquid 222. Electromagnetic energy is applied by the UV-LED energy source to the layer 206 and one or both liquids absorb the radiation, which causes the material to melt or sinter, and then fix or solidify upon cooling in the regions where the liquid 204 was deposited. For example, the UV-LED energy source may irradiate the layer of material 206 with electromagnetic radiation within a wavelength range, and because the liquids are absorbers of UV, the liquids absorb the energy and transfer this energy to the material in the vicinity of the liquid. Regions with a low color density, i.e. regions with little or no second liquid 222 will still solidify because of the presence of the first liquid 204.

The apparatus may further comprise a controller 216. The controller 216 may control the various components of the apparatus 200 via one or more communication paths 218, as described for the example apparatus 100 in relation to FIG. 1. The controller 216 can control the ordering and timing of when the first and second printheads 202, 220 deposit their respective liquids onto the layer of particulate material 206.

Figure 3:
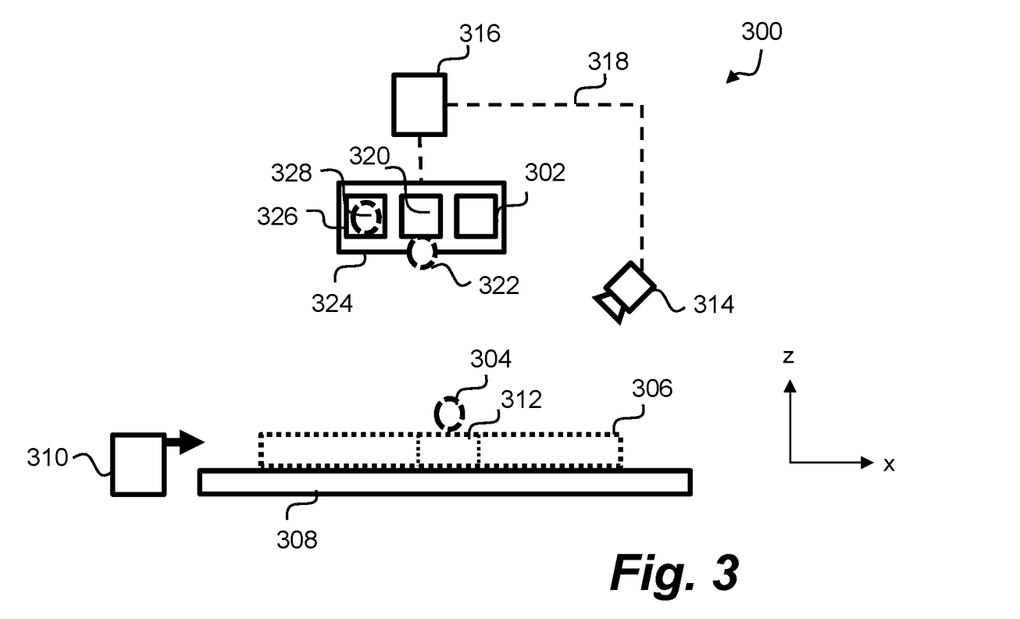
FIG. 3 is a diagram of a three-dimensional printing apparatus according to a third example.

FIG. 3 shows another example three-dimensional printing apparatus 300 that is substantially the same as apparatus 200, but further comprises a third printhead 320 configured to deposit a third liquid 328 upon a layer of material 306. The third printhead 326 is arranged adjacent to the second printhead 320, such that the first printhead 302 and the third printhead 326 are arranged at opposite ends of the print carriage 324. Other arrangements are possible.

The three-dimensional printing apparatus 300 comprises a first printhead 302. The first printhead 302 is arranged to deposit a first liquid 304 upon a layer of particulate build material 306 that is received within a build area, such as on platform 308. Similarly, the second printhead 320 is arranged to deposit a second liquid 322 upon a layer of material 306. In one case, the first, second and third printheads 302, 320, 326 are located in a moveable carriage 324 located above the material 306. The carriage 324 may move in one, two or three directions over the material 306. In another case, the platform 308 and material 306 may be moveable underneath a static carriage 324. In some examples the first, second and third printheads 302, 320 are not located in a carriage 324. Various combinations of approaches are possible.

In the example of FIG. 3, the first printhead 302 comprises one or more nozzles configured to deposit the first liquid 304 onto a portion 312 of the layer of particulate material 306. Similarly, the second printhead 320 comprises one or more nozzles configured to deposit the second liquid 322 onto a portion 312 of the layer of particulate material 206.

The apparatus 300 further comprises an UV-LED energy source 314.

In one implementation, the apparatus 300 may be used to print a colored three-dimensional object. As described in relation to FIG. 2, the first liquid 304 may be a white colored liquid, such as a dye, and the second liquid 322 may be another colored liquid, such as a pigment-based ink. Both the first liquid 304 and the second liquid 322 absorb ultraviolet radiation. In one example the third printhead 326 is substantially similar to the second printhead 320 except the third liquid is a different color to the second color. Thus the third liquid is also an absorber of UV radiation. In one example, the first liquid may be white, the second liquid may be Cyan and the third color may be Magenta. Two or more printheads may also be included for Yellow and Black. After the first, second and third liquids have been applied, the UV-LED energy source 314 may irradiate the layer of material 306 with electromagnetic radiation to cause portions of the material to solidify where at least one liquid has been applied. In one example, the second and third printheads are a single entity, and the second and third liquids are different, but are deposited from different nozzles within the single printhead.

However, in another implementation, the third printhead 326 is substantially similar to the first printhead in that the third liquid 328 deposited by the third printhead 326 is the same liquid as the first liquid. For example, the third liquid may also be a white liquid. By having two printheads dispensing the first liquid, the print carriage is symmetrical, and can thus be used to deposit the first liquid onto dry material 306 before applying a colored liquid from one or more other printheads. Accordingly, as the print carriage 324 moves over the layer of material 306 along the x-axis, the carriage is able to first deposit the white liquid regardless of which direction along the x-axis the carriage is moving. Thus, in examples where the liquid deposited by the third printhead 302 is the first liquid, the UV-LED energy source 314 may irradiate the layer of material 306 with electromagnetic radiation after the first and second printheads 302, 320 have deposited their liquids, and before the third printhead 326 deposits the first liquid again. Alternatively, the carriage 324 moves in the y-direction, above more dry material before the third printhead deposits the first liquid.

The apparatus may further comprise a controller 316. The controller 316 may control the various components of the apparatus 300 via one or more communication paths 318, as described for the example apparatus 100 in relation to FIG. 1. The controller 316 can control the ordering and timing of when the first, second and third printheads 302, 320, 326 deposit their respective liquids onto the layer of particulate material 206.

Figure 4:
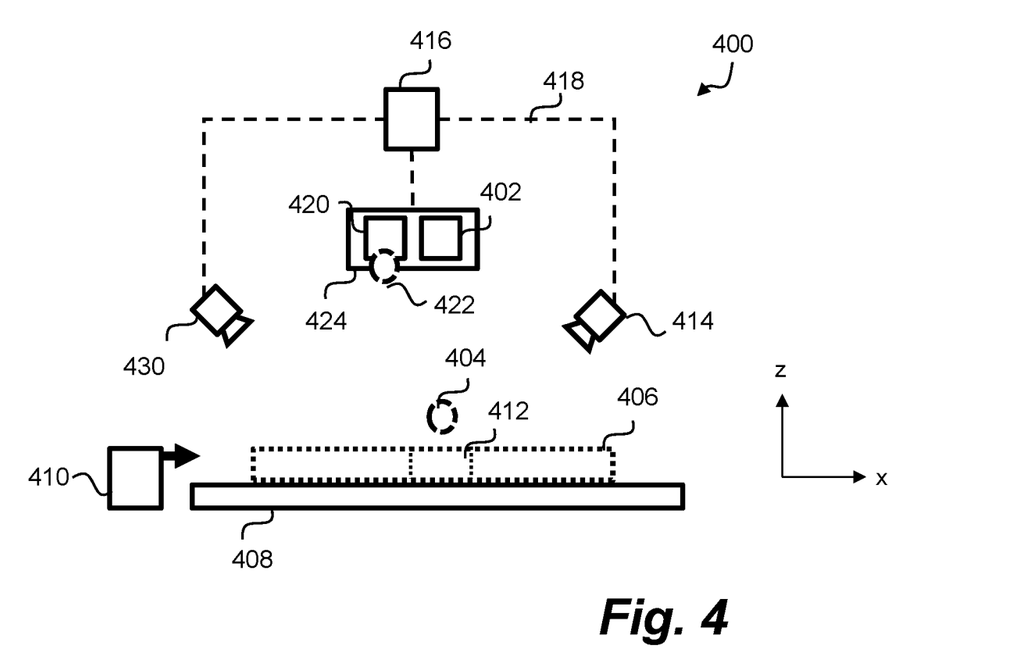
FIG. 4 is a diagram of a three-dimensional printing apparatus according to a fourth example.

FIG. 4 shows another example three-dimensional printing apparatus 400 that is substantially the same as apparatus 200, but further comprises a second UV-LED energy source 430. The apparatus depicted in FIGS. 1 and 3 may also comprise a second UV-LED energy source in certain examples.

As was described for FIG. 2, the three-dimensional printing apparatus 400 comprises a first printhead 402. The first printhead 402 is arranged to deposit a first liquid 404 upon a layer of particulate build material 406 that is received within a build area, such as on platform 408. Similarly, the second printhead 420 is arranged to deposit a second liquid 422 upon a layer of material 406. Both the first liquid 404 and the second liquid 422 are absorbers of ultraviolet radiation. In one case, the first and second printheads 402, 420 are located in a moveable carriage 424 located above the material 406. The carriage 424 may move in one, two or three directions over the material 406. In another case, the platform 408 and material 406 may be moveable underneath a static carriage 424. In some examples the first and second printheads 402, 420 are not located in a carriage 224. Various combinations of approaches are possible.

The apparatus may further comprise a controller 416. The controller 416 may control the various components of the apparatus 400 via one or more communication paths 418, as described for the example apparatus 100 in relation to FIG. 1. The controller 416 can control the ordering and timing of when the first and second printheads 402, 420 deposit their respective liquids onto the layer of particulate material 406 and the ordering and timing of when the first and second UV-LED energy sources 414, 430 irradiate the particulate material 406.

In one example, the first printhead 402 deposits the first liquid 404, before the second printhead 420 deposits the second liquid 422. However, in contrast to the example apparatus 200 of FIG. 2, the second UV-LED energy source 430 is to irradiate the layer of particulate material 406, and therefore the first liquid, before the second printhead 420 deposits the second liquid 422. Thus, the second UV-LED energy source 430 pre-heats the material. Following the pre-heating, the second liquid is deposited, and finally the first UV-LED energy source 414 irradiates the layer of particulate material 406, and therefore both the first and second liquids, to cause a portion of the material to solidify.

In some examples both the first and second UV-LED energy sources are the same, and thus emit electromagnetic radiation having substantially the same physical properties such as peak wavelength and spectral width. In other examples however the first UV-LED energy source has a first peak wavelength and the second UV-LED energy source has a second peak wavelength, the first wavelength and the second wavelength being different to each other. Wavelengths and/or spectral widths can be selected depending upon their use. For example, certain wavelengths and/or spectral widths may be more suited for pre-heating and other wavelengths and/or spectral widths may be more suited for finally fusing and solidifying the material.

Pre-heating of the first liquid can also be achieved in apparatus where there is a single UV-LED energy source, such as in the examples of FIGS. 1-3. In this instance, the first UV-LED energy source can be used for both pre-heating and finally fusing the material.

Figure 5:
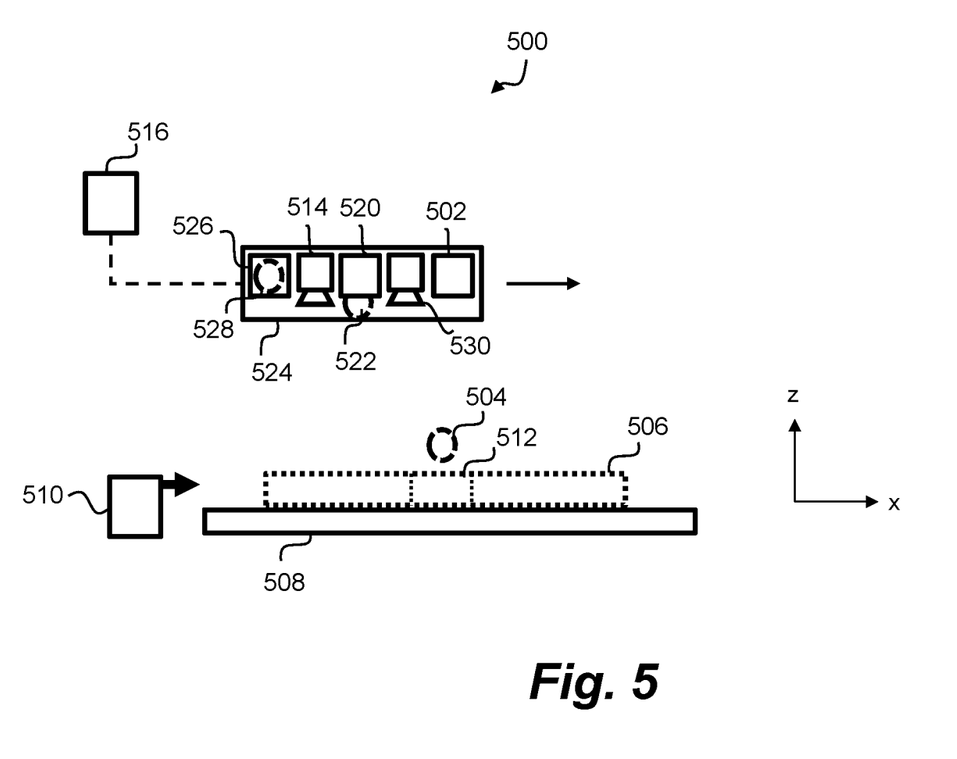
FIG. 5 is a diagram of a three-dimensional printing apparatus according to a fifth example.

In some examples, the first UV-LED energy source is located on the print carriage. Similarly, in apparatus comprising a second UV-LED energy source, one or both energy sources may be located on the print carriage. This allows the UV-LED energy source to move with the print carriage. FIG. 5 shows such an example.

FIG. 5 shows another example three-dimensional printing apparatus 500 that is substantially the same as apparatus 300, but further comprises a second UV-LED energy source 530. In addition, the first and second UV-LED energy sources 514, 530 are located on the carriage. Each UV-LED energy source is arranged to heat the entire layer of material 506. In some examples the first and second UV-LED energy sources are not located on the carriage.

As was described for FIG. 3, the apparatus 500 comprises a first printhead 502, a second printhead 520 and a third printhead 526. The first printhead 502 is arranged to deposit a first liquid 504 upon a layer of particulate build material 506 that is received within a build area, such as on platform 508. Similarly, the second printhead 520 is arranged to deposit a second liquid 522 upon the layer of material 506. Similarly, the third printhead 526 is arranged to deposit a third liquid 528 upon the layer of material 506. In one case, the carriage 524 is moveable in one, two or three directions over the material 506. In another case, the platform 508 and material 506 may be moveable underneath a static carriage 524. Various combinations of approaches are possible.

The apparatus 500 further comprises first and second UV-LED energy sources 514, 530. In FIG. 5, the first and third printheads 502, 526 are arranged at opposite ends of the print carriage 524 and one or more second printheads 522 are located therebetween. Arranged adjacent to the first printhead 502 is the second UV-LED energy source 530, which itself is arranged adjacent the second printhead 520. Arranged adjacent to the third printhead 526 is the first UV-LED energy source 514, which itself is arranged adjacent the second printhead 520. In this example, the first and third printheads 502, 526 are arranged to deposit the same liquid.

In one implementation, the apparatus 500 may be used to print a colored three-dimensional object. As described in relation to FIG. 2, the first liquid 504, 528 may be a white colored liquid, such as a dye, and the second liquid 522 may be another colored liquid, such as a pigment-based ink. Both the first liquid 504, 528 and the second liquid 522 absorb ultraviolet radiation.

In use, the print carriage 524 moves at least moves along the x-direction. At a particular time, the carriage is moving in the positive x-direction, towards the right hand side of FIG. 5. Thus, each of the elements on the carriage are operated in sequence as the carriage moves. For example, the first printhead 502 first deposits a first liquid onto the particulate material 506. Next, the second UV-LED energy source 530 is to irradiate the layer of material 506 to pre-heat the material 506. Next, one or more second printheads 520 deposit colored liquids to develop colors within the layer of material 506. Next, the first UV-LED energy source 514 irradiates the layer 506 to solidify the material in regions where the liquids have been deposited. At this time, the print carriage is located towards the right hand side of FIG. 5. Next, the supply mechanism 510 deposits a subsequent layer of material on top of the layer 506. The process can then repeat again, with the carriage moving in the opposite direction, for example. Hence the third printhead first deposits the first liquid onto the new layer of material.

In one example, each colored layer of particulate material is formed on top of a previously formed white layer. This can be useful if the colored layer has a coverage value of less than 100%. Alternating white and colored layers can be therefore created. For example, this can be achieved by initially forming a white layer, in which the white first liquid is applied to a first layer of particulate material. Electromagnetic energy from a UV-LED energy source is then applied to the first layer, which causes the first layer to fuse. The first layer therefore forms a white reflective layer upon which a subsequent full, or partial colored layer can be formed. For example, after forming the white first layer, a second layer of particulate material can be applied on top of the first layer. The first liquid is then deposited in some regions, where color is not to be applied, and the second liquid is deposited in other regions where color is to be applied. Electromagnetic energy from a UV-LED energy source is then applied to the second layer, which causes the second layer to fuse. The layer 506 shown in FIG. 5 would therefore correspond to this second layer, and the first layer would be located below layer 506. As mentioned, this technique can be used to create an object having less than a 100% color coverage. For example, a 50% cyan colored layer can be achieved in this way. This may be useful when the colored liquids are to be deposited on a white surface and the particulate material itself is not pure white when fused. In some examples, pre-heating the colored layer after depositing one of the liquids is optional.

The apparatus may further comprise a controller 516. The controller 516 may control the various components of the apparatus 500 via one or more communication paths 518, as described for the example apparatus 100 in relation to FIG. 1. The controller 516 can control the ordering and timing of when the printheads 502, 520, 526 deposit their respective liquids onto the layer of particulate material 506 and the ordering and timing of when the first and second UV-LED energy sources 514, 530 irradiate the particulate material 506.

In some examples, the controller is to cause a first printhead to deposit a first liquid which absorbs ultraviolet radiation onto a first layer of particulate material, and cause an UV-LED to irradiate the first layer of particulate material, after the first liquid has been deposited onto the first layer of particulate material, thereby to heat the first liquid and cause a portion of the particulate material to solidify. In some examples the controller is further to cause a supply mechanism to form a second layer of particulate material and cause the first printhead to deposit the first liquid onto the second layer, and cause a second printhead to deposit a second liquid onto the second layer. The controller is further to cause an UV-LED to irradiate the second layer of particulate material thereby to heat the first and second liquid and cause a portion of the particulate material to solidify.

In some examples, such as the systems described in FIGS. 1-5, each of UV-LEDs in a UV-LED array irradiate the layer of particulate material at substantially the same time. However, in other examples, the UV-LEDs in the UV-LED array irradiate the layer sequentially, by applying energy in a scanning manner.

Figure 6:
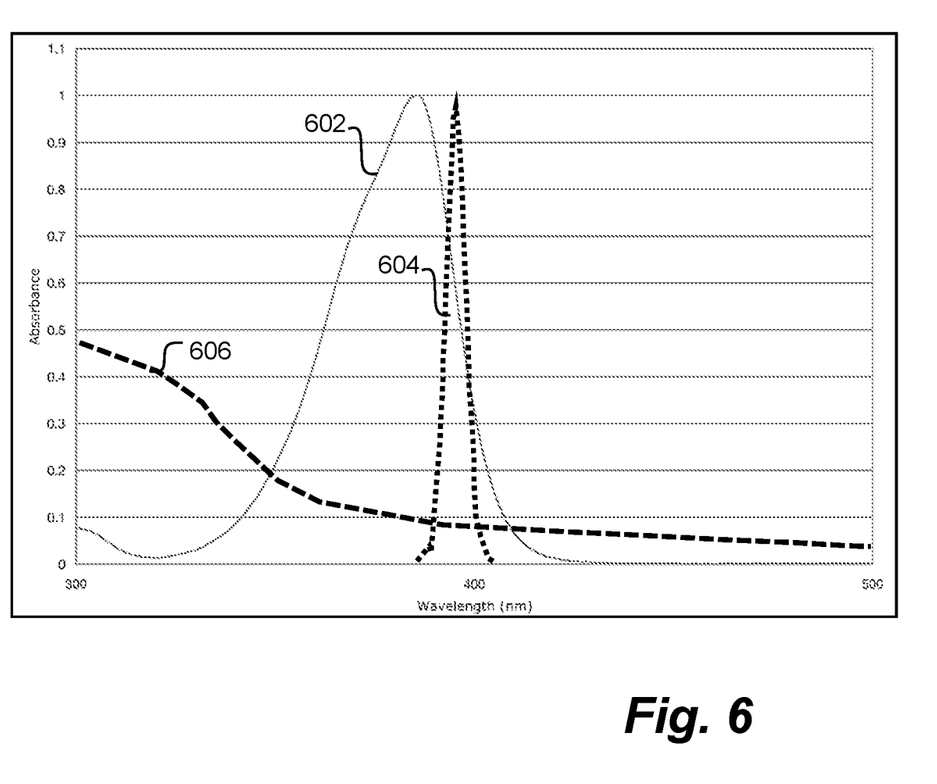
FIG. 6 shows absorption spectra of particulate material and liquids according to an example.

FIG. 6 shows an example dye absorption spectrum 602 for a first liquid, in this case Contone-O, a UV-LED emission spectrum with a maximum intensity emission at 385 nm, and an absorption spectrum 606 of PA-12, an example particulate material. PA-12 has an absorbance peak at around 350 nm. In this example, therefore, most of the emitted UV energy will be absorbed in the dye, and little energy will be absorbed by the material in regions where the dye has not been deposited. For example, around 70% of the energy incident on the dye will be absorbed by the dye and less than 10% of the energy incident on the particulate material will be absorbed by the particulate material in regions where there is no dye. In certain instances, the energy that is absorbed by the particulate material in regions where there is no dye is not sufficient to cause the material to melt and subsequently fuse. In this example, similar results may be achieved using Contone-O, PA-12 and a UV-LED having a maximum intensity at a wavelength between about 385 nm to about 405 nm.

In some examples the UV-LED energy source is to emit electromagnetic energy having a maximum intensity at a wavelength between about 350 nm to about 405 nm. Suitable first liquids may be used which have an absorbance peak within this range. Wavelengths within this range may be sufficiently far removed from the peak absorbance of PA-12, to reduce the likelihood of the dry particulate material from reaching its melting temperature.

It will be appreciated that the selected UV-LED wavelength is dependent upon the liquids being used and on the particulate material, so other suitable wavelengths may be used that achieve the same, or similar results.

In the example of FIG. 6, the first liquid (dye) has an absorbance peak at about 385 nm, however in other examples other liquids may be used which have absorbance peaks in the range of about 350 nm to about 420 nm. Hence, suitable UV LEDs can be selected which emit radiation within this range. Due to practical limitations, such as cost, UV-LEDs may be selected which emit radiation in the range of 365 nm to 400 nm.

Figure 7:
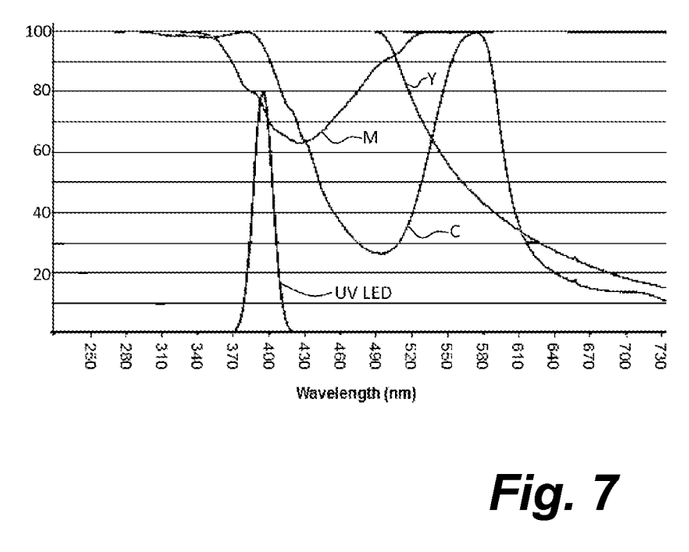
FIG. 7 shows absorption spectra of inks according to an example.

FIG. 7 shows the absorption spectrums of example yellow Y, magenta M, and cyan C pigment-based inks. Black colorant has substantially 100% absorption efficiency over this range. The output intensity of an example UV-LED, in this example a 395 nm LED, over its spectral width is also shown (with an arbitrary vertical scale), labeled UV LED. A 395 nm LED is an example of a readily available LED. Another such example is a 405 nm LED. The spectral width of this example UV-LED is about 20 nm. Such a UV-LED energy source will be absorbed efficiently by all of these colorants. For example, at this wavelength Cyan will have approximately a 95% absorbance efficiency, Magenta will have approximately a 75% absorbance efficiency, Yellow will have approximately a 100% absorbance efficiency and Black will have approximately a 100% absorbance efficiency. Similarly, as explained in FIG. 6, a UV-LED with a maximum intensity at about 395 nm will also be efficiently absorbed by Contone-O, having an absorbance efficiency of around 70% and will be poorly absorbed by dry PA-12, having an absorbance efficiency of around 10%.

Figure 8:
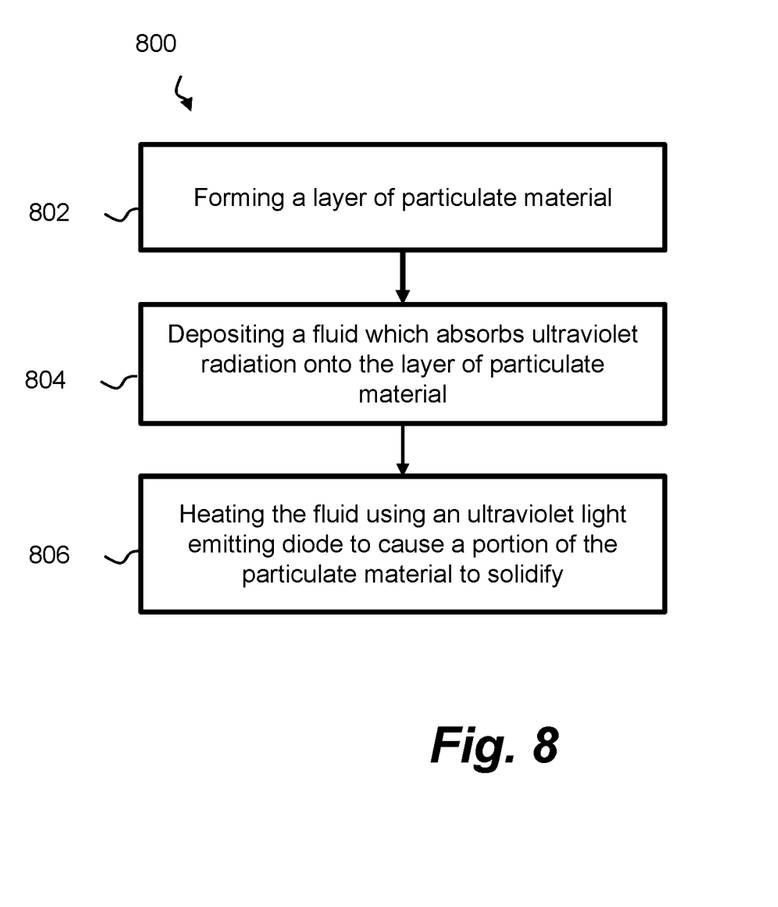
FIG. 8 shows a method of producing a three-dimensional object according to an example.

FIG. 8 is a flow diagram showing a method 800. The method can be performed by the example apparatus 100, 200, 300, 400, 500. At block 802 the method comprises forming a layer of particulate material. At block 804 the method comprises depositing a liquid which absorbs ultraviolet radiation onto the layer of particulate material. At block 806 the method comprises, after the liquid has been deposited onto the layer of particulate material, heating the liquid using an ultraviolet light emitting diode energy source to cause a portion of the particulate material to solidify.

In some example methods, heating the liquid using an ultraviolet light emitting diode energy source comprises irradiating the layer of particulate material with ultraviolet electromagnetic energy having a spectral width of about 5 nm to about 50 nm.

In some example methods, heating the liquid using an ultraviolet light emitting diode energy source comprises irradiating the layer of particulate material with ultraviolet electromagnetic energy having a maximum intensity at a wavelength between about 200 nm to about 405 nm.

In some example methods, heating the liquid using an ultraviolet light emitting diode energy source comprises irradiating the layer of particulate material with ultraviolet electromagnetic energy having a maximum intensity at a wavelength between about 385 nm to about 405 nm.

In some example methods, the liquid is a first liquid, and the method further comprises heating the first liquid using an ultraviolet light emitting diode energy source before depositing a second liquid, wherein the second liquid absorbs ultraviolet radiation.

Certain system components and methods described herein may be implemented by way of non-transitory computer program code that is storable on a non-transitory storage medium. In some examples, the controllers may comprise a non-transitory computer readable storage medium comprising a set of computer-readable instructions stored thereon. The controllers may further comprise one or more processors 903. In some examples, control may be split or distributed between two or more controllers which implement all or parts of the methods described herein.

Figure 9:
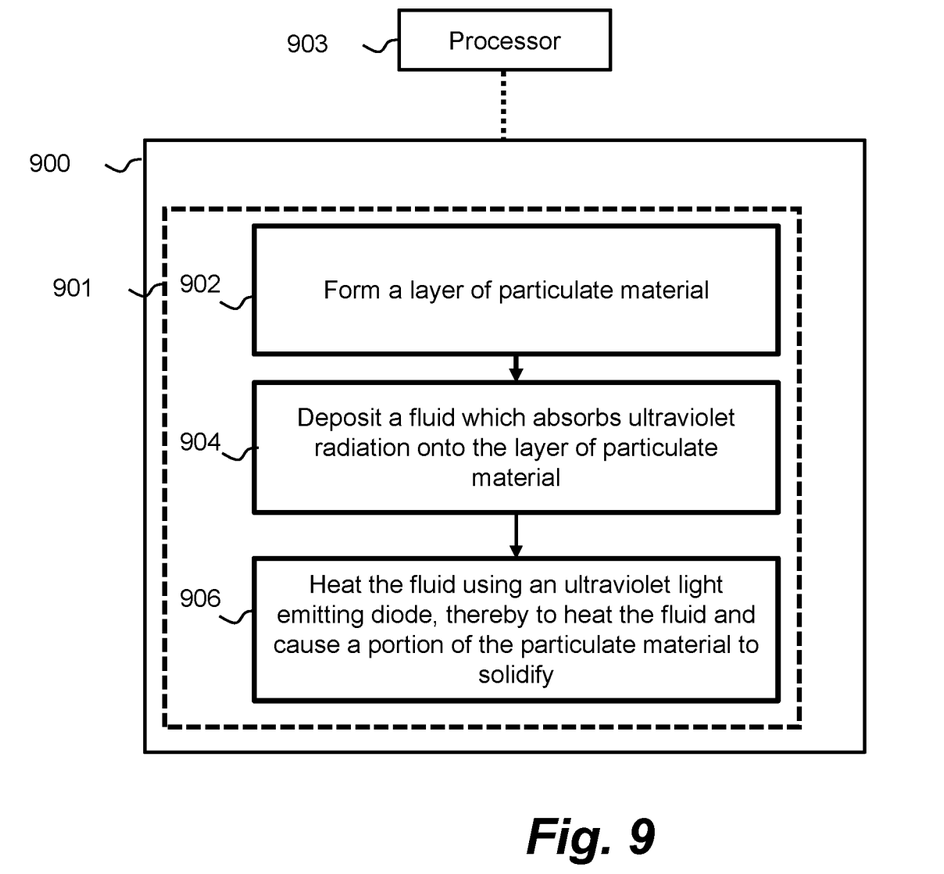
FIG. 9 shows a diagrammatic representation of an example set of computer-readable instructions within a non-transitory computer-readable storage medium.

FIG. 9 shows an example of such a non-transitory computer-readable storage medium 900 comprising a set of computer readable instructions 901 which, when executed by at least one processor 903, cause the processor(s) 903 to implement a method according to examples described herein. The computer readable instructions 901 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In an example, instructions 901 cause the processor 903 in a stacking system to, at block 902, form a layer of particulate material. At block 904, the instructions 901 cause the processor 903 to deposit a liquid which absorbs ultraviolet radiation onto the layer of particulate material. At block 906, the instructions 901 cause the processor 903 to, after the liquid has been deposited onto the layer of particulate material, heat the liquid using an ultraviolet light emitting diode energy source, thereby to heat the liquid and cause a portion of the particulate material to solidify. In some examples, the ultraviolet light emitting diode energy source emits electromagnetic energy having a maximum intensity at a wavelength of between about 200 nm to about 405 nm.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. An apparatus for printing a three-dimensional object, the apparatus comprising:
   a controller;
   an ultraviolet (UV) light emitting diode (LED) energy source that emits energy having a peak wavelength between about 200 nm to about 405 nm and a narrow spectral width of less than or equal to 50 nm surrounding the peak wavelength;
   a white-colored build material having an absorption peak that is greater than 100 nm outside of the peak wavelength of the UV LED energy source; and
   a printhead that deposits a fusing agent onto the white-colored build material, the fusing agent having an absorption peak that is within the narrow spectral width of the peak wavelength of the UV LED energy source;
   wherein the controller is programmed to:
      cause the printhead to deposit the fusing agent onto a portion of the white-colored build material; and cause the UV LED energy source to emit energy that heats the fusing agent deposited onto the portion of the white-colored build material, wherein heating the fusing agent causes the portion to solidify.

2. The apparatus of claim 1, wherein the fusing agent is colorless.

3. The apparatus of claim 1, wherein the fusing agent has a white color.

4. The apparatus of claim 1, wherein the white-colored build material absorbs less than about 20% of the energy emitted by the UV-LED energy source.

5. The apparatus of claim 1, wherein the white-colored build material absorbs less than about 10% of the energy emitted by the UV-LED energy source.

6. The apparatus of claim 1, wherein the UV LED energy source emits more than 60% of its power within the narrow spectral width.

7. The apparatus of claim 1, wherein the UV LED energy source emits more than 90% of is power within the narrow spectral width.

8. A method performed by an apparatus for printing a three-dimensional object, the method comprising:
  causing a printhead, via a controller of an apparatus for printing a three-dimensional object, to deposit a fusing agent onto a portion of a white-colored build material, wherein the white-colored build material has an absorption peak that is greater than 100 nm outside of a peak wavelength of an ultraviolet (UV) light emitting diode (LED) energy source of the apparatus, and wherein the fusing agent has an absorption peak that is within a narrow spectral width of the peak wavelength of the UV LED energy source; and
  causing the UV LED energy source of the apparatus, via the controller, to emit energy that heats the fusing agent deposited onto the portion of the white-colored build material, wherein heating the fusing agent causes the portion to solidify, wherein the UV LED energy source emits energy having a peak wavelength between about 200 nm to about 405 nm and a narrow spectral width of less than or equal to 50 nm surrounding the peak wavelength.

9. The method of claim 8, wherein the fusing agent is colorless.

10. The method of claim 8, wherein the fusing agent has a white color.

11. The method of claim 8, wherein the white-colored build material absorbs less than about 20% of the energy emitted by the UV-LED energy source.

12. The method of claim 8, wherein the white-colored build material absorbs less than about 10% of the energy emitted by the UV-LED energy source.

13. The method of claim 8, wherein the UV LED energy source emits more than 60% of its power within the narrow spectral width.

14. The method of claim 8, wherein the UV LED energy source emits more than 90% of is power within the narrow spectral width.

15. An system for printing a three-dimensional object, the system comprising:
  a hardware controller;
  an ultraviolet (UV) light emitting diode (LED) energy source that emits energy having a peak wavelength between about 285 nm to about 405 nm and a narrow spectral width of less than or equal to 50 nm surrounding the peak wavelength;
  a substrate supply mechanism that supplies a white-colored build material having an absorption peak that is greater than 100 nm outside of the peak wavelength of the UV LED energy source; and
  a printhead that deposits a fusing agent onto the white-colored build material, the fusing agent having an absorption peak that is within the narrow spectral width of the peak wavelength of the UV LED energy source, and wherein the fusing agent absorbs longer wavelengths than the white-colored build material;
  wherein the controller is programmed to:
    cause the printhead to deposit the fusing agent onto a portion of the white-colored build material; and
    cause the UV LED energy source to emit energy that heats the fusing agent deposited onto the portion of the white-colored build material, wherein heating the fusing agent causes the portion to solidify.

16. The system of claim 15, wherein the fusing agent is colorless or has a white color.

17. The system of claim 15, wherein the white-colored build material, where fusing agent has not been applied, absorbs less than about 20% of the energy emitted by the UV-LED energy source.

18. The system of claim 15, wherein the white-colored build material, where fusing agent has not been applied, absorbs less than about 10% of the energy emitted by the UV-LED energy source.

19. The system of claim 15, wherein the UV LED energy source emits more than 60% of its power within the narrow spectral width.

20. The system of claim 15, wherein the UV LED energy source emits more than 90% of is power within the narrow spectral width.

* * * * *